United States Patent [19]

Knox et al.

[11] 4,105,114
[45] Aug. 8, 1978

[54] APPARATUS AND PROCESSES

[75] Inventors: Donald Edward Knox, Canterbury; Suleiman Mohammed Fakira, Ringwood; Kenneth Andrew William Mitchell, Elwood, all of Australia

[73] Assignee: ICI Australia Limited, Melbourne, Australia

[21] Appl. No.: 750,019

[22] Filed: Dec. 13, 1976

[30] Foreign Application Priority Data

Dec. 30, 1975 [AU] Australia .............................. 4427/75

[51] Int. Cl.² ............................................ B65D 25/08
[52] U.S. Cl. ..................................... 206/219; 61/45 B
[58] Field of Search ................. 215/DIG. 8; 206/219, 206/220; 61/45 B; 229/56

[56] References Cited

U.S. PATENT DOCUMENTS

| | | | |
|---|---|---|---|
| 3,208,102 | 9/1965 | Rubio | 206/219 |
| 3,359,361 | 12/1967 | Oakman | 206/219 |
| 3,385,427 | 5/1968 | Stouls | 206/219 |
| 3,737,027 | 6/1973 | Ball | 206/219 |
| 3,756,388 | 9/1973 | Murphy | 206/219 |
| 3,913,733 | 10/1975 | Flesch et al. | 206/219 |

Primary Examiner—William Price
Assistant Examiner—Bruce H. Bernstein
Attorney, Agent, or Firm—Cushman, Darby & Cushman

[57] ABSTRACT

A capsule useful in processes for stabilizing and reinforcing rock formations and for securing elements in boreholes, said capsule containing in a multiplicity of compartments materials capable of producing a solid composition and comprising at least one non-supple reinforcing member located within said capsule.

17 Claims, 3 Drawing Figures

APPARATUS AND PROCESSES

This invention relates to a capsule useful in processes for stabilizing and reinforcing rock formations and for securing elements in boreholes.

The use of hardening resins for securing elements such as anchor bolts in boreholes is well known and such resins are also used for securing reinforcing bolts in the roofs of mines. In general terms such resins have been introduced into a desired position for example a borehole in a frangible container consisting of two separate compartments one of which contains a resinous composition and the other contains a hardener composition capable of converting the resinous composition to a solid form when the contents of the two compartments are admixed, and the element to be secured is brought into contact with the frangible container by inserting it into the borehole in a rotational or vibratory manner such that the compartments of the frangible container are fractured and the resinous and hardener compositions are mixed. The mixture so formed subsequently hardens and secures the element in the desired position. Such procedures have been described for example in British Pat. Nos. 998240 and 1,160,123.

The resinous compositions may comprise for example polyester, epoxy, polyurethane or polystyrene resins or precursors thereof. Optionally such compositions may also contain inert filling materials such as silica or calcium carbonate. The nature of the hardener component will depend on the type of resinous composition but in general it comprises a catalyst capable of promoting polymerisation or crosslinking of the resinous composition.

It has been proposed to use a frangible container comprising an outer glass tube containing a resinous component and an inner glass tube containing a hardener component. Such containers suffered from the disadvantage that they could not be made by a continuous process and furthermore they were prone to premature breakage in use. This type of container was modified by substituting a flexible frangible outer compartment for the outer glass tube. This type of container was more robust but fabrication problems derived from the use of different component materials made production difficult. A further improvement was proposed wherein both the inner and outer tubes were fabricated from flexible frangible materials such as plastic films in the form of tapes. Whilst this improvement enabled the capsules to be fabricated on a continuous basis, it was found in commercial practice that sometimes the physical characteristics of the tubes were such that it was difficult to fracture the compartments, especially the compartment containing the hardener, in a manner which ensured that the desired degree of mixing of the compositions would occur within a reasonable time.

It has now been found that the fracturing of the container is facilitated if there is provided a capsule comprising at least one reinforcing material.

Accordingly we provide in a capsule having a first compartment in which an amount of a resinous composition is located and a second compartment located within said first compartment and in which there is located an amount of a hardener composition sufficient to produce a solid composition when said resinous composition and said hardener composition are admixed and wherein at least said second compartment is fabricated from a flexible frangible material, the improvement wherein said capsule comprises at least one non-supple reinforcing member located within said first compartment and attached to said first and second compartments, said reinforcing member being characterized in that it comprises solid polymerized material optionally and preferably in contact with a substrate. By the term non-supple we mean that the reinforcing member is not easily bent. Thus such a non-supple reinforcing member may have differing physical forms ranging from a stiff, unyielding, firm or rigid form to a form wherein only slight deflection of the member is possible. The reinforcing member of the invention may be made from a diversity of materials. Thus it may be made for example by extrusion means from polymeric materials of high softening point such as polysulphones. Alternatively it may be made from a polymeric material laminated on to or impregnated into a substrate such as a textile. Yet again the member may be derived from fluid precursors of polymeric materials which may be converted in situ by chemical means such as by means of a catalyst or by photopolymerization to polymerized material such precursors being located on or in a material suitable for use as a substrate. Thus for example the precursors may be liquids located in a tube in the presence of an amount of a polymerisation catalyst sufficient to ensure that the precursor material is converted to a solid form only after the member is located within the first compartment. Still further a substrate such as a textile material may be impregnated with a mixture of one or more precursors or monomers and a catalyst which is then converted to a solid form by photopolymerisation. Suitable polymeric materials which may be used in conjunction with substrates include thermosetting materials such as epoxy resins, polyurethanes, poly(alkylacrylates) poly(alkylalkacrylates), urea-formaldehyde resins or melamine-formaldehyde resins. Polyesters are particularly useful as components of the reinforcing members. Where desired the reinforcing member may contain inert filling materials such as silica, quartz and the like.

We also provide a method for preparing a capsule according to the invention which method in a general form comprises forming a first compartment containing a resinous composition or a precursor thereof and locating within and attaching to said first compartment firstly a second compartment containing a composition capable of converting said resinous composition to a solid form when admixed therewith, and secondly a nonsupple reinforcing member or a polymerisable precursor therefor. In one embodiment of this process the second compartment and its contents and a polymerisable precursor of a reinforcing member may be prefabricated and located within the first compartment concurrently with a step whereby a resinous composition or precursor therefor is being loaded into the first compartment. Conveniently the compartments of the capsule may be fabricated from material in the form of thin sheet, foil or film. Compartments fabricated in the form of tubes are particularly convenient. Suitable materials from which the compartments may be made include synthetic plastic materials such as polymers or copolymers of ethylene, propylene, vinyl chloride, vinylidene chloride or ethylene terephthalate. Other materials useful for this purpose include cellulose, coated paper or metal foils. The compartments may be heat sealed and/or located together by conventional compression closure members such as tying devices for example tying wire, tape, string or a compressible metal clip. Whilst the resinous composition and the hardener composition may be in either the first or second compartment the hardener is usually the smaller component and it is generally more convenient for the resinous composition to occupy the space in the capsule between the compartment containing the hardener and the reinforcing member.

In a preferred embodiment of the invention the capsules may be made on a continuous basis by pumping a hardening composition into a first thin walled tube; pumping a polymerisable precursor of a reinforcing member into a second thin walled tube; crimping and sealing these two loaded tubes within a third tube with a first closure member; loading a resinous composition into the third tube by means of a pump; sealing and crimping the three tubes together with a second closure member to form a precursor to the capsule of the invention; applying a third closure member to the partly filled third tube and the two loaded tubes; cutting the tubes transversely between the second and third closure members; and allowing the polymerisable precursor of the reinforcing member to convert to a solid form to provide a capsule of the invention.

In another embodiment of the invention the reinforcing member may be a prefabricated plastic material having a high softening point such as a polysulphone. This may be extruded from a die in a conventional manner in a desired shape and then located within the capsule in a manner similar to that described above when a polymerisable precursor of a reinforcing member in a tube was used.

The capsules of the invention are advantageous over prior art capsules used for the same purpose in that they can be made by a continuous process and due to the arrangement of the components of the capsule facilitate the fracturing of the capsule together with more uniform mixing of the contents of the capsule. This has the attendant advantage that the resultant reaction mixture is more effective in processes for stabilizing and reinforcing rock formations and for securing elements in bore holes.

Accordingly in a still further embodiment of our invention we provide a process for stabilizing and reinforcing rock formations and for securing elements in boreholes which process comprises locating a capsule according to the invention in a desired position with respect to said rock formation or borehole, locating a stabilizing, reinforcing or securing element - suitably a boltin proximity to said capsule, fracturing said capsule by means of said element thereby liberating the compositions therein so that they come in contact with the said element, mixing the said compositions in a manner to ensure bathing of the said element in the resultant mixture and for a time sufficient to convert said bathing mixture to a hardened form which secures said element in a desired position in said rock formation or borehole.

The invention is now illustrated by, but is not limited to, the following examples in which all parts and percentages are on a weight basis unless otherwise specified. Example 3 is included as a comparative example.

EXAMPLE 1

A first composition comprising a mixture of 2 parts of silicone oil available commercially from Imperial Chemical Industries Limited under the designation AF 111/1000, 1 part of a paste of benzoyl peroxide in dimethyl phthalate in a weight ratio of 1:1, and 1 part of a paste of 2,4-dichlorobenzoyl peroxide in the silicone oil in a weight ratio of 1:1 was placed in a reservoir of a constant displacement pump having an outlet in the form of a nozzle. A first tube fabricated from cellulose film and having a radius of 8 millimeters was placed in a shirred configuration over the nozzle. One end of the first tube was closed and attached to a withdrawal means which removed the first tube from its position over the nozzle whilst the first tube was being loaded by means of the pump with 12 grams of the first composition per 330 millimeters of length of the first tube. There was thus obtained a first product suitable to use as a component of a capsule according to the invention in which a hardening composition was located in a first tube. In a similar manner a second composition comprising a mixture of 9000 parts of a polyester resin available commercially from Resinous Chemicals of Melbourne, Australia, under the designation of Resin 110-000, 9000 parts of quartz powder, 50 parts of a paste of benzoyl peroxide in dimethylphthalate in a weight ratio of 1:1 and 3 parts of dimethylaniline was loaded into a second tube, identical with the first tube, at a rate of 25 grams per 330 millimeters of length of the second tube. There was thus obtained a second product suitable to use as a precursor of a reinforcing member of a capsule according to the invention. A constant displacement pump of the type referred to above was modified by clamping a metal sleeve over the nozzle of the pump so as to form an annulus between the sleeve and the nozzle. A tube fabricated from a film comprising polyethylene terephthalate and available under the registered trade mark of "Melinex" and having a radius of 12.5 millimeters was placed in a shirred configuration over the metal sleeve. The first product and the second product referred to above were introduced into the annulus of the modified pump and their ends were attached to an end of the "Melinex" tube by a first closure member in the form of a U-clip bent so as to embrace the ends of the tubes. The closure member was also attached to a withdrawal means which removed the "Melinex" tube from its position over the sleeve and concurrently drew the first product and second product through the annulus into the "Melinex" tube as the "Melinex" tube was being loaded by means of the pump with 270 grams per 330 millimeters of length of the "Melinex" tube of a resinous composition which had been located in a reservoir of the modified pump.

The resinous composition was formed by mixing the following materials:

| | | |
|---|---|---|
| Polyester (Resin 110-000) | 9000 | parts |
| Calcite powder | 9000 | parts |
| Quartz powder | 9000 | parts |
| Hexachloroethane | 780 | parts |
| Bentonite | 500 | parts |
| Antimonyoxide | 200 | parts |
| Orange coloured pigment | 50 | parts |
| Dimethylaniline | 36 | parts |
| 1,4-Naphthoquinone | 1.8 | parts |

When 33 centimeters of a multitubular intermediate product had been formed a second closure member in the form of a bent U-clip was applied to the intermediate product to effect closure of the loaded tubes. A similar third closure member was then applied between the second closure member and the nozzle to the partially loaded "Melinex" tube so as to embrace that tube and the first and second product referred to above. A cut was made transversely on the tubes between the second and third closure members and there was thus obtained a precursor to a capsule according to the invention. The third closure member was attached to the withdrawal means and the cycle was continued on a continuous basis in a manner similar to that set out above. The precursor capsules so obtained were stored for 24 hours after being made during which time the second compositions had become solid and in combination with the second tubes formed reinforcing members of the capsules of the invention.

EXAMPLE 2

A capsule prepared as described in Example 1 and having an external diameter of 25 millimeters and a length of 33 centimeters was placed at the toe of a cylindrical hole having a diameter of 28 millimeters and a depth of 61 centimeters. A deformed bolt having a diameter of 19 millimeters and a length of 91.5 centimeters was installed in the hole using an impact wrench. The capsule was fractured by the bolt and the contents of the capsule were mixed for 10 seconds by rotating the bolt. Five minutes after the rotation of the bolt had ceased an increasing load was applied to the bolt until the bolt was removed from the hole. This procedure was repeated a further five times. The loads required to remove the bolt ranged from 8.5 to 11 tons weight and averaged 10 tons weight.

EXAMPLE 3

For the purposes of comparison the general procedure of Example 2 was repeated except that the capsule of the invention was replaced by a capsule of the prior art which was similar to the capsule of the invention except that it was devoid of the improving reinforcing member. The loads required to remove the bolt ranged from 2.5 to 6 tons weight and averaged 5 tons weight.

EXAMPLE 4

The general procedure of Example 1 was repeated except that the second composition of that example was used to coat and impregnate hempen cord having a diameter of 5 millimeters to produce a second product suitable to use as a precursor of a reinforcing member of a capsule according to the invention. The capsule so obtained was suitable for securing bolts in boreholes.

EXAMPLE 5

The general procedure of Example 1 was repeated except that the second composition of that example was replaced by a second composition comprising a mixture of 120 parts of an urea-formaldehyde resin composition available commercially from ICI Australia Limited under the designation of "Syrup N50", 168 parts of quartz powder and 12 parts of a 10% solution of ammonium chloride in water. The capsule so obtained was suitable for securing bolts in boreholes.

EXAMPLE 6

The general procedure of Example 1 was repeated except that the second composition of that example was replaced by a second composition comprising a two component system available from Ciba-Geigy Australia Limited under the registered trade mark "Araldite" and which forms, on mixing the components, an epoxy resin. The capsule so obtained was suitable for securing bolts in boreholes.

EXAMPLE 7

The general procedure of Example 1 was repeated except that the second composition of that example was replaced by a second composition comprising a mixture of 10 parts of a polyol available commercially under the designation "Daltolac" 50, 18 parts of an isocyanate available commercially under the designation "Suprasec" D, and 20 parts of quartz powder. "Daltolac" and "Suprasec" are registered trade marks. The capsule so obtained was suitable for securing bolts and boreholes.

EXAMPLE 8

The general procedure of Example 1 was repeated except that the polyethylene terephthalate tube of that example was replaced by a tube having a radius of 12.5 millimeters and fabricated from a polyethylene film. The capsule so obtained was suitable for securing bolts in boreholes.

EXAMPLE 9

The general procedure of Example 1 was repeated except that the second cellulose tube used in that example as a substrate for the reinforcing member was replaced by a similar tube fabricated from a closely woven nylon fabric of plain weave and having a weight of 1.1 oz/square yard. The capsule so obtained was similar to that of Example 1.

EXAMPLE 10

The general procedure of Example 1 was repeated except that the second composition of that example was replaced by a second composition comprising a mixture of 1000 parts of methylmethacrylate monomer, 100 parts of powdered poly(methylmethacrylate), 3 parts of N,N-dimethylaniline and 10 parts of a paste of benzoyl peroxide in dimethylphthalate in a weight ratio of 1:1. The capsule so obtained was suitable for securing bolts in boreholes.

The invention is further illustrated by a description of a typical capsule and wherein reference is made to the accompanying drawings.

Figure 1:
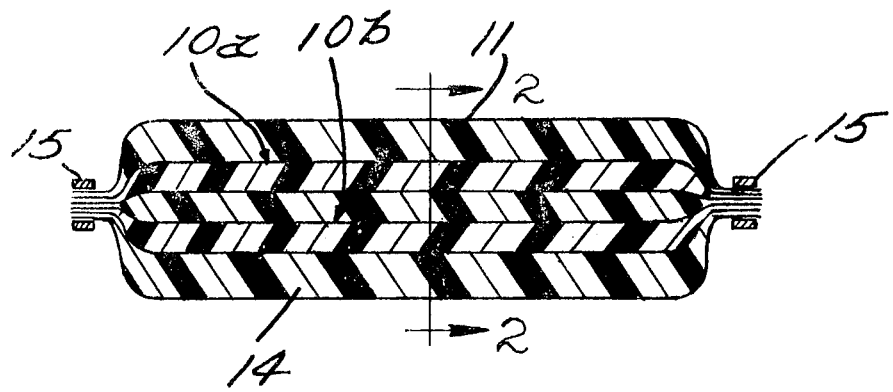
FIG. 1 is a longitudinal section of a capsule of the invention.

In FIG. 1 the capsule comprises a first compartment 11 in the form of a tubular plastic film and which contains an amount of a resinous composition 14; a second compartment 10a which is tubular and made from synthetic plastic film and contains an amount of a hardener composition 12; and a polymeric non-supple reinforcing member 13 which for convenience is located within a tube 10b made of a plastic film. The ends of the second compartment 10a, the tube 10b and the reinforcing member 13 are compressed together and closed by closure members 15 which are in the form of a metal clip. Closure members 15 also embrace the ends of compartment 11 so that the ends of compartment 10a, tube 10b and reinforcing member 13 are held firmly within and are surrounded by compartment 11. As shown in FIG. 1 the second compartment 10a and the reinforcing member 13 are substantially coaxial with first compartment 11.

Figure 2:
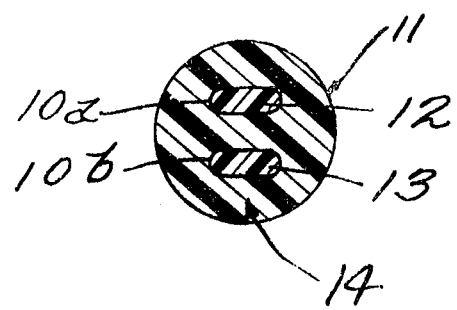
FIGS. 2 and 3 are each a cross section of a capsule of FIG. 1 on the line II—II.
Figure 3:
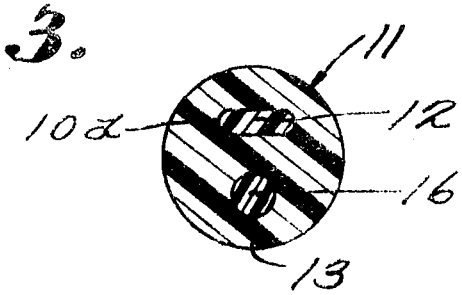

FIG. 2 depicts a further embodiment of the invention wherein the non-supple reinforcing member 13 was formed from a high dernier textile thread 16 coated and impregnated with the precursors of a polymeric composition which was subsequently polymerized to a solid.

We claim:

1. In a capsule useful for stabilizing and reinforcing rock formations and for securing elements in boreholes and having
   (a) a first compartment in which an amount of a resinous composition is located and
   (b) a second compartment located within said first compartment and in which there is located an amount of a hardener composition sufficient to produce a solid composition when said resinous composition and said hardener composition are admixed and wherein at least said second compartment is fabricated from a flexible frangible material,
   the improvement wherein said capsule further includes (c) at least one non-supple reinforcing member located within said first compartment and attached to said first and second compartments, said reinforcing member being characterized in that it comprises solid polymerized material.

2. A capsule according to claim 1 wherein said polymerized material comprises thermosetting material.

3. A capsule according to claim 1 wherein said polymerized material is selected from the group consisting of epoxy resins, polyurethanes, poly(alkylacrylates), poly(alkylalkacrylates), urea-formaldehyde resins and melamine-formaldehyde resins.

4. A capsule according to claim 1 wherein said polymerized material is a polyester.

5. A capsule according to claim 1 wherein said reinforcing member comprises inert filling material.

6. A capsule according to claim 1 wherein said reinforcing member comprises a substrate in contact with said polymerized material.

7. A capsule according to claim 6 wherein the said substrate is tubular.

8. A capsule according to claim 6 wherein the said substrate comprises a textile material.

9. A capsule according to claim 1 wherein at least one of said compartments comprises synthetic plastic material.

10. A capsule according to claim 9 wherein the said plastic material is selected from the group consisting of polymers and copolymers of ethylene, propylene, vinyl chloride, vinylidene chloride and ethylene terephthalate.

11. A capsule according to claim 10 wherein the said plastic material is a film comprising poly(ethylene terephthalate).

12. A capsule according to claim 1 inclusive wherein at least one of said compartments comprises cellulosic film.

13. A process for preparing a capsule useful for stabilizing and reinforcing rock formations and for securing elements in boreholes wherein said process comprises forming a first compartment containing a resinous composition or a precursor thereof and locating within and attaching to said first compartment firstly a second compartment containing a composition capable of converting said resinous composition to a solid form when admixed therewith, and secondly a non-supple reinforcing member or a polymerisable precursor therefor.

14. A process according to claim 13 which comprises in combination the steps of pumping a hardening composition into a first thin walled tube; pumping a polymerisable precursor of a reinforcing member into a second thin walled tube; crimping and sealing these two loaded tubes within a third tube with a first closure member; loading a resinous composition into the third tube by means of a pump; sealing and crimping the three tubes together with a second closure member to form a precursor to the capsule according to claim 1; applying a third closure member to the partly filled third tube and the two loaded tubes; cutting the tubes transversely between the second and third closure members; and allowing the polymerisable precursor of the reinforcing member to convert to a solid form.

15. A process according to claim 13 wherein said reinforcing member is a prefabricated material having a high softening point.

16. A process for stabilizing and reinforcing rock formations and for securing elements in boreholes which process comprises locating a capsule according to claim 1 in a desired position with respect to said rock formation or borehole, locating a stabilizing, reinforcing or securing element in proximity to said capsule, fracturing said capsule by means of said element thereby liberating the compositions therein so that they come into contact with the said element, mixing the said compositions in a manner to ensure bathing of the said element in the resultant mixture and for a time sufficient to convert said bathing mixture to a hardened form which secures said element in a desired position in said rock formation or borehole.

17. A process according to claim 16 wherein said element is a bolt.

* * * * *